US008061392B2

(12) United States Patent
Casey

(10) Patent No.: US 8,061,392 B2
(45) Date of Patent: Nov. 22, 2011

(54) VARIABLE VOLUME HYDROGEN STORAGE

(75) Inventor: Daniel G. Casey, Kingwood, TX (US)

(73) Assignee: Texaco Inc., San Ramon, CA (US)

( * ) Notice: Subject to any disclaimer, the term of this patent is extended or adjusted under 35 U.S.C. 154(b) by 518 days.

(21) Appl. No.: 12/342,775

(22) Filed: Dec. 23, 2008

(65) Prior Publication Data

US 2010/0154924 A1 Jun. 24, 2010

(51) Int. Cl.
*B65B 1/04* (2006.01)
(52) U.S. Cl. ............... 141/2; 141/26; 141/67; 141/197
(58) Field of Classification Search ............... 141/2, 21, 141/25, 26, 67, 197; 222/3, 373, 395
See application file for complete search history.

(56) References Cited

U.S. PATENT DOCUMENTS 5,454,408 A 10/1995 DiBella et al.
5,687,776 A * 11/1997 Forgash et al. ............... 141/11
6,182,717 B1 * 2/2001 Yamashita ..................... 141/82
6,755,225 B1 * 6/2004 Niedwiecki et al. ........ 141/231
7,325,561 B2 * 2/2008 Mathison et al. ............ 137/256
2006/0174965 A1 8/2006 Hobbs

FOREIGN PATENT DOCUMENTS

JP 2004293752 10/2004

OTHER PUBLICATIONS

PCT International Search Report dated May 6, 2010; International Application No. PCT/US2009/068762 (3 pgs.).

* cited by examiner

*Primary Examiner* — Christopher Kim
(74) *Attorney, Agent, or Firm* — Melissa Patangia

(57) ABSTRACT

In the present invention methods for storing gaseous hydrogen employing an ionic liquid are disclosed. The ionic liquid is used to displace the volume in the storage tanks. By displacing the volume in the storage tanks with the ionic liquid, the storage pressure can remain constant and the "stranded" gas can be eliminated. This constant pressure will also allow for a reduction in the number of storage tanks needed to provide the required inventory at hydrogen fueling stations. In addition, this constant pressure will provide a complete and fast fill to the vehicle.

14 Claims, 3 Drawing Sheets

Fill Rate vs Inventory

VARIABLE VOLUME HYDROGEN STORAGE

FIELD OF THE INVENTION

The present invention relates generally to the storage of gaseous hydrogen and in particular to the use of an ionic liquid in the storage of gaseous hydrogen at hydrogen fueling stations.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluents gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of a hydrogen infrastructure to provide wide-spread generation, storage and distribution.

One way to overcome this difficulty is through the operation of hydrogen fueling stations. At hydrogen fueling stations, hydrogen generators, such as reformers or electrolyzers, are used to convert hydrocarbons to a hydrogen rich gas stream. Hydrocarbon-based fuels, such as natural gas, LPG, gasoline, and diesel, require conversion processes to be used as fuel sources for most fuel cells. Current art uses multi-step processes combining an initial conversion process with several clean-up processes The initial process is most often steam reforming (SR), autothermal reforming (ATR), catalytic partial oxidation (CPOX), or non-catalytic partial oxidation (POX), or combinations thereof. The clean-up processes are usually comprised of a combination of desulphurization, high temperature water-gas shift, low temperature water-gas shift, selective CO oxidation, selective CO methanation or combinations thereof. Alternative processes for recovering a purified hydrogen-rich reformate include the use of hydrogen selective membrane reactors and filters.

The gaseous hydrogen is then compressed and stored in stationary storage tanks at the hydrogen fueling stations to provide inventory to fuel internal combustion engines and fuel cell vehicles. The storage of gaseous hydrogen at hydrogen fueling stations is extremely expensive due to its low density. Large volumes of gaseous hydrogen are required to provide sufficient inventory which results in a large footprint for the storage. This large footprint is problematic as space is at a premium at a fueling station.

In addition to the issues surrounding the space necessary for the storage of gaseous hydrogen at a hydrogen fueling station, ensuring the complete filling of vehicles is another issue related to the operation of a hydrogen fueling station. Compression of the stored gas into the vehicle would require a prohibitively large compressor to achieve the fueling rates required. Pressure equalization is used to fuel the on-board storage tanks of vehicles. The pressure differential between the storage at the hydrogen fueling station and the vehicle is used to drive the fueling process. High pressure is required to achieve "full" fill density. This high pressure requires a corresponding inventory of "low" pressure gas. Specifically, for 1 kg of gas above 350 bar, over 5 kg of gas below 350 bar is needed. The result is "stranded" gas in the storage tanks. The stranded gas is the low pressure gas which was needed to have a volume of high pressure gas available for dispensing.

FIG. 1 shows a comparison of vehicle percentage full versus storage inventory from data from a demonstration hydrogen fueling station. As shown in FIG. 1, when the inventory of hydrogen in the storage tanks is less than 75% a vehicle will not receive a "full" fill. The vehicles are "full" when the inventory in the storage tank is greater than 75% "full."

In addition to the issues involved in ensuring the complete filling of vehicles, the rate of the fill is another issue related to the operation of a hydrogen fueling station. Differential pressure is used to drive the gaseous hydrogen from storage tanks to the vehicle. Therefore, the rate at which a vehicle is filled depends on the storage pressure. A high pressure differential corresponds to a high flow rate and shorter fueling time. A low pressure differential corresponds to a low flow rate and a longer fueling time. The Department of Energy (DOE) has provided targets for the average fill rate. The current target for the average fill rate is 1 kg/min (2006). The future target for the average fill rate is 1.67 kg/min (2010).

The storage pressure is related to the inventory in the storage tanks. FIG. 2 shows a data comparison of fill rate versus storage inventory from two demonstration hydrogen fueling stations. As shown in FIG. 2, the average flow rate can be reduced when the storage is not full. When storage is less than 85% full the fill rate can drop below the 1 kg/min target.

The present invention addresses the need to reduce both the cost and size of hydrogen storage at hydrogen fueling stations. In addition, the present invention also addresses the need to provide a complete and fast fill.

SUMMARY OF THE INVENTION

In the present invention methods for storing gaseous hydrogen employing an ionic liquid are disclosed. The ionic liquid is used to displace the volume in the storage tanks. By displacing the volume in the storage tanks with the ionic liquid, the storage pressure can remain constant and the "stranded" gas can be eliminated. This constant pressure will also allow for a reduction in the number of storage tanks needed to provide the required inventory at hydrogen fueling stations. In addition, this constant pressure will provide a complete and fast fill to the vehicle.

BRIEF DESCRIPTION OF THE FIGURES

The description is presented with reference to the accompanying figures in which.

DETAILED DESCRIPTION OF THE INVENTION

The present invention discloses methods for storing gaseous hydrogen at hydrogen fueling stations. The methods of the present invention employ ionic liquids to displace the volume in the storage tanks. By using an ionic liquid to displace the volume in the hydrogen storage tanks, the volume of the storage tanks is allowed to vary. By varying the volume, the pressure of the hydrogen storage tanks can be kept constant while the mass in the tanks varies.

Ionic liquids represent a class of salts with melting points less than 100° C. Ionic liquids comprise positively (cations) and negatively (anions) charged ions. Ionic liquids are distinguished by a range of properties including, but not limited to, negligible vapor pressure, thermal stability, nonflammability, high ionic conductivity, and remarkable solvating properties. Ionic liquids are commercially available from companies such as Merck Chemicals.

In the present invention, an ionic liquid is used to displace the volume in the hydrogen storage tanks during fueling. In addition to the above properties, an ionic liquid will not contaminate high purity hydrogen due to its low vapor pressure. There can be minimal retention of hydrogen in the ionic liquid due to its low solubility (in the ionic liquid) and there will be separation of the hydrogen and the ionic liquid. The ionic liquid selected for the present invention will have a low vapor pressure, however, as one of ordinary skill in the art will appreciate, not all ionic liquids will be suitable for this purpose.

Figure 1:
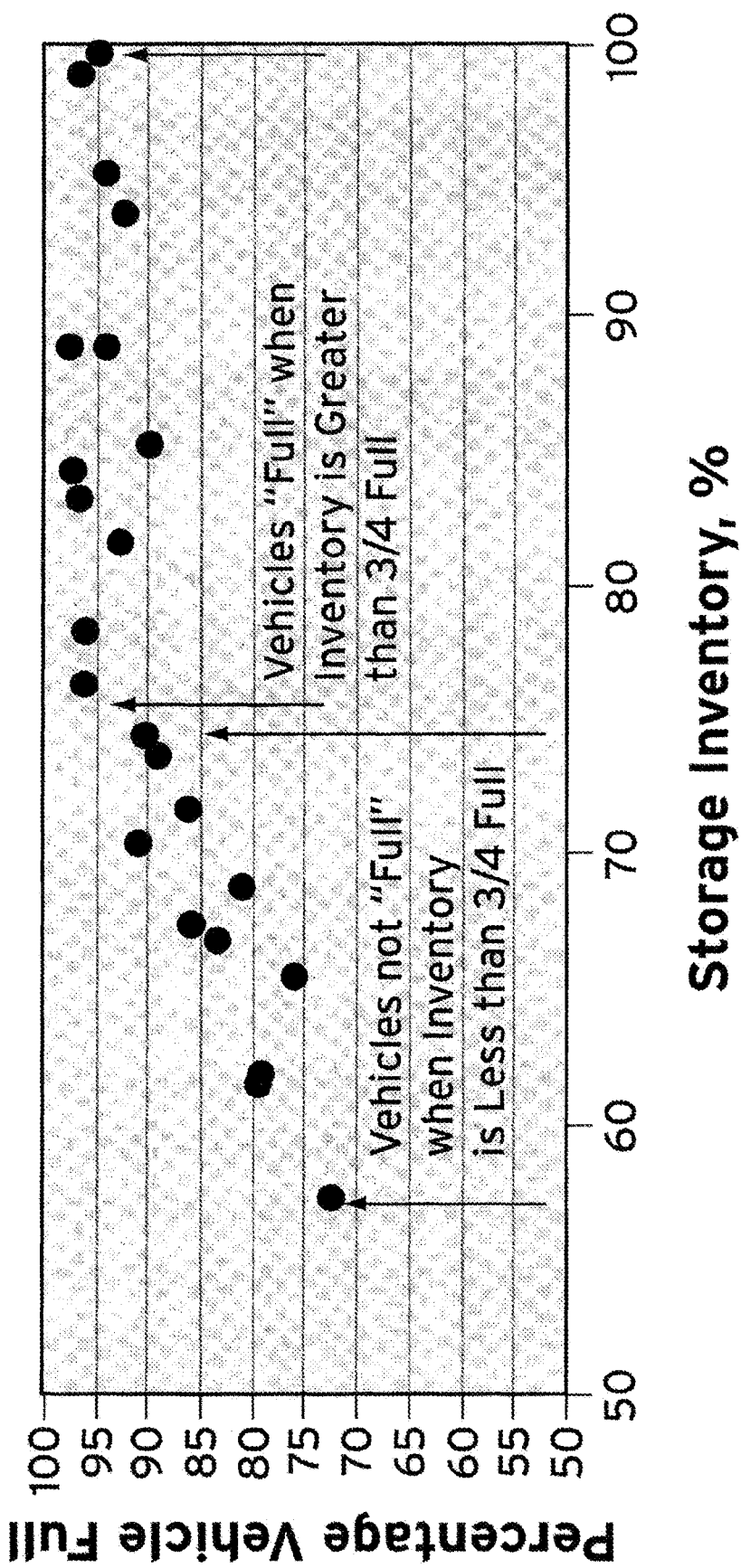
FIG. 1 shows a comparison of vehicle percentage full versus storage inventory from data from a demonstration hydrogen fueling station.
Figure 2:
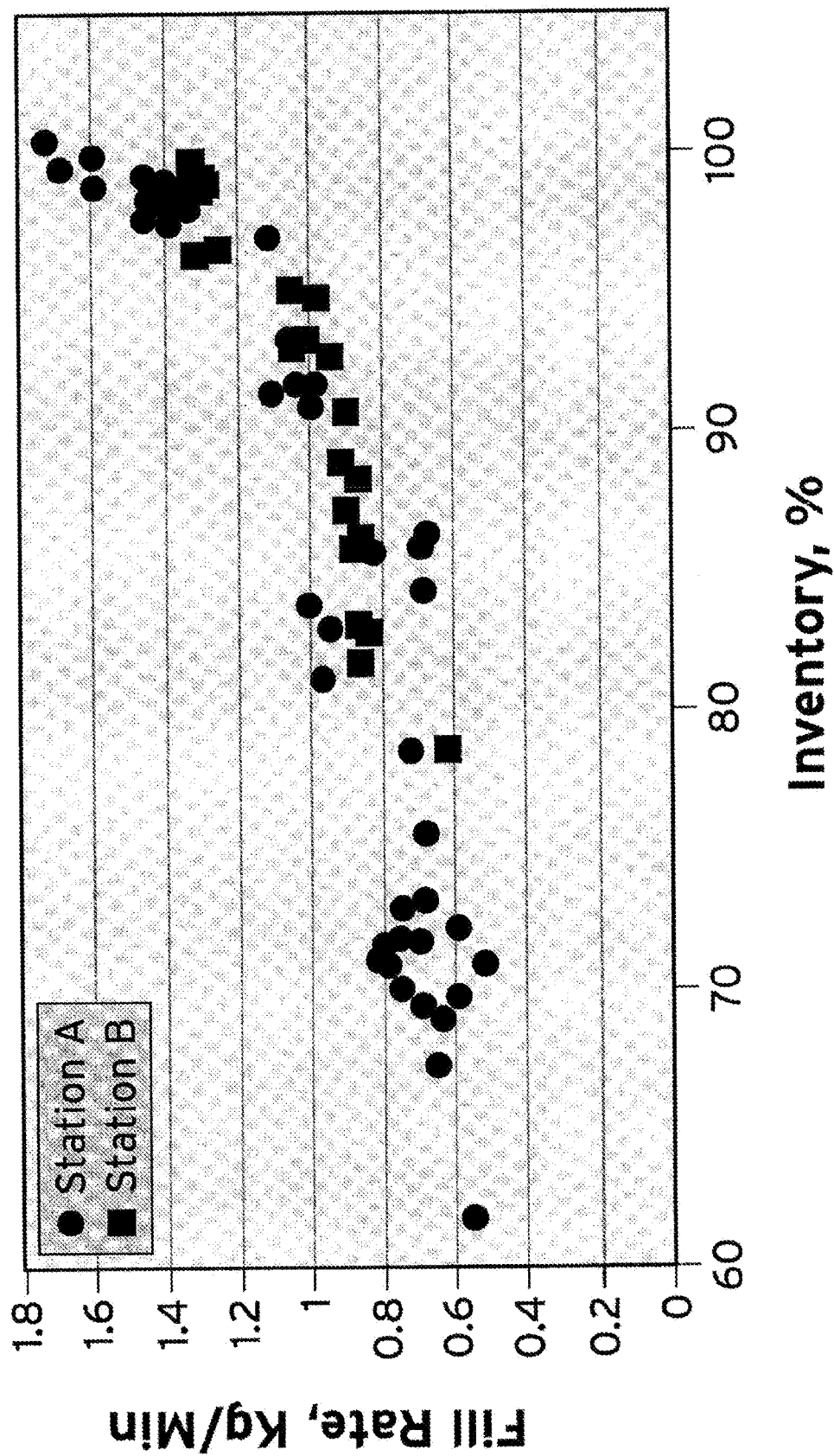
FIG. 2 shows a data comparison of fill rate versus storage inventory from two demonstration hydrogen fueling stations.
Figure 3:
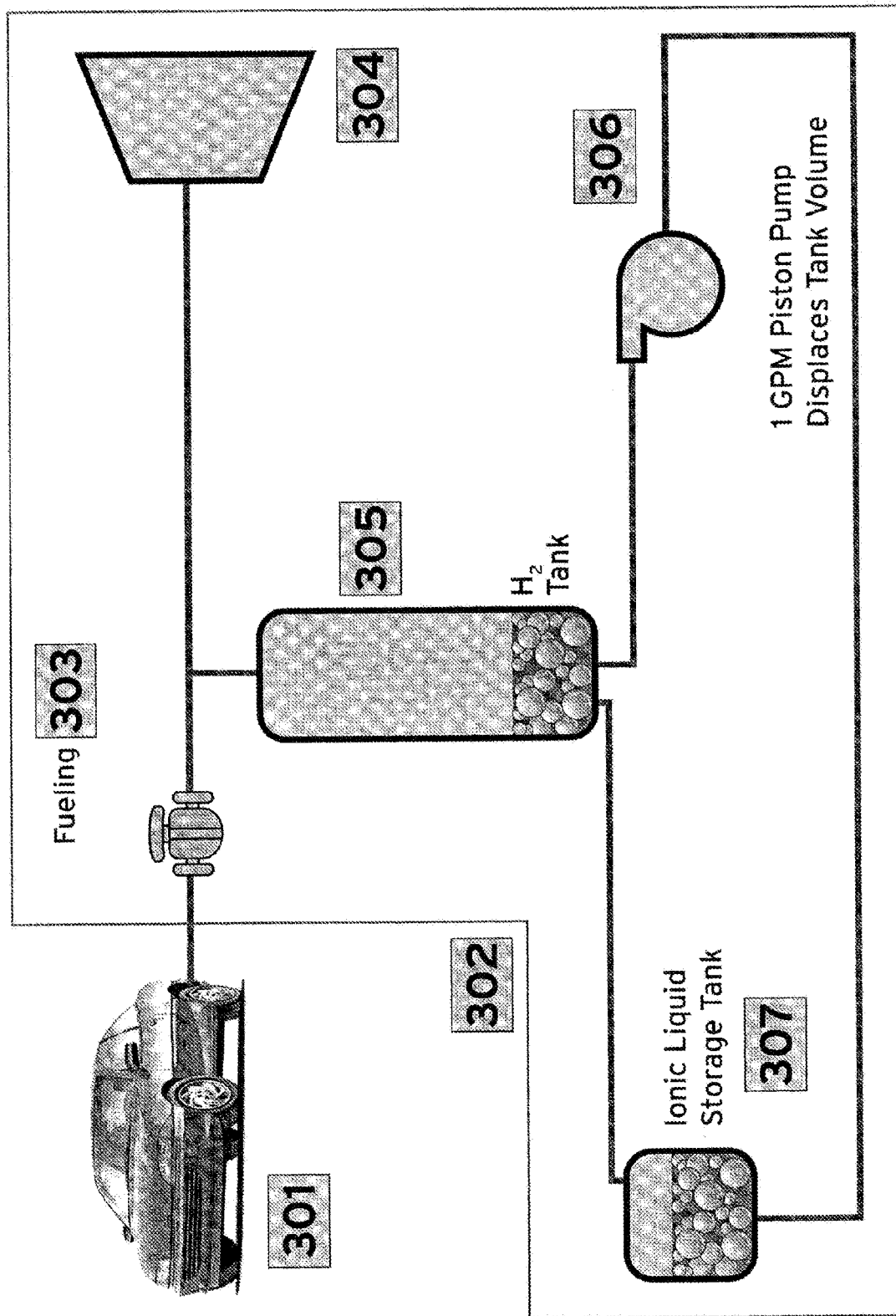
FIG. 3 depicts one embodiment of the methods of the present invention employing an ionic liquid in the storage of gaseous hydrogen.

With reference to FIG. 3, FIG. 3 depicts one embodiment of the methods of the present invention. A vehicle 301 visits a hydrogen fueling station 302 for fueling. The gaseous hydrogen will be dispensed to the vehicle 301 via a dispenser 303. A compressor 304 will increase the pressure of gaseous hydrogen in the hydrogen storage tank 305 to approximately 6250 psig. The differential pressure between the vehicle 301 and the storage tank 305 will then drive the fueling of the vehicle 301. Contemporaneously, a pump 306 will be used to pump the ionic liquid from the ionic liquid storage tank 307 to the hydrogen storage tank 305. The pump 306 will maintain the pressure of the hydrogen storage tank 305 during fueling by displacing the hydrogen storage tank 305 volume and filling the hydrogen storage tank 305 with the ionic liquid. As the compressor 304 replenishes the inventory of gaseous hydrogen in the gaseous hydrogen storage tank 305 from the hydrogen generator (not shown), the ionic liquid is displaced. With the methods of the present invention, there will be a horsepower savings in pumping the ionic liquid versus compressing the hydrogen gas.

Without the use of an ionic liquid, 5 kg of gas below 350 bar is needed for 1 kg of gas above 350 bar. This low pressure gas is "stranded" gas. The maintenance of constant pressure in the hydrogen storage tank 305 and the elimination of "stranded" gas by the use of the ionic liquid will allow for the reduction in the number of storage tanks 305 required to maintain the necessary inventory for the hydrogen fueling station 302. This will result in both an economic and space savings at the hydrogen fueling station by reducing the number of storage tanks—the cost of the extra storage tanks will be eliminated and the space taken up by the extra storage tanks will be eliminated. By employing the methods of the present invention, a hydrogen fueling station would be able to operate with a single storage tank that is always at 6250 psig. In addition, the methods of the present invention will result in an economic savings by increasing the amount of "usable" hydrogen.

In the above embodiment, one hydrogen storage tank 305 is shown. As one in the art will appreciate, one or more hydrogen storage tanks may be used at a hydrogen fueling station. These tanks may be arranged as one large tank or arranged in "cascade" format. As used throughout, "hydrogen storage tank" is used interchangeably with "hydrogen storage tanks" and both refer to one or more than one hydrogen storage tank.

By maintaining a constant pressure in the hydrogen storage tank 305, vehicles 301 can achieve both a full and fast fill both of which are dependent on the pressure in the hydrogen storage tank 305. The vehicles 301 may include any hydrogen internal combustion engines or fuel cell vehicles including, but not limited to, automobiles, trucks, sports utility vehicles, and buses.

In the above embodiment, the compressor increased the pressure of the gaseous hydrogen in the hydrogen storage tank to approximately 6250 psig. In the embodiment described above, 6250 psig is used as an example. As one of skill in the art will appreciate, the methods of the present invention are not limited to increasing the pressure of the gaseous hydrogen to a pressure of approximately 6250 psig. For example, the hydrogen storage could be maintained at a pressure close to the dispensing pressure and dispensing could still occur.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for storing gaseous hydrogen comprising:
storing gaseous hydrogen in a hydrogen storage tank;
storing an ionic liquid in an ionic liquid storage tank;
increasing the pressure of the gaseous hydrogen via a compressor;
dispensing the gaseous hydrogen to a vehicle; and
displacing volume in the hydrogen storage tank with the ionic liquid from the ionic liquid storage tank via a pump while the gaseous hydrogen is dispensed to the vehicle.

2. The method of claim 1 wherein the gaseous hydrogen is stored at a hydrogen fueling station.

3. The method of claim 1 wherein the gaseous hydrogen is generated at a hydrogen fueling station.

4. The method of claim 1 wherein the compressor increases the pressure of the gaseous hydrogen in the hydrogen storage tank to approximately 6250 psig.

5. The method of claim 1 wherein the compressor increases the pressure of the gaseous hydrogen in the hydrogen storage tank to approximately 1200 psig 6. The method of claim 1 wherein the gaseous hydrogen is dispensed to the vehicle via differential pressure.

7. The method of claim 1 further comprising replenishing inventory of the gaseous hydrogen in the hydrogen storage tank via the compressor while displacing the ionic liquid.

8. The method of claim 1 wherein the ionic liquid has a low vapor pressure.

9. The method of claim 1 where hydrogen has low solubility in the ionic liquid.

10. The method of claim 1 wherein the hydrogen storage tank comprises a single hydrogen storage tank.

11. The method of claim 1 wherein the hydrogen storage tank comprises a group of hydrogen storage tanks configured as a single tank.

12. The method of claim 1 wherein the vehicle comprises a car.

13. The method of claim 1 wherein the vehicle comprises a bus.

14. The method of claim 1 wherein the gaseous hydrogen is dispensed via differential pressure.

\* \* \* \* \*